April 17, 1962  R. NOSER ETAL  3,030,567
ELECTRICAL CONTROL ARRANGEMENT OPERATING
WITH VOLTAGE-COMPARISON
Filed Sept. 30, 1958  3 Sheets-Sheet 3
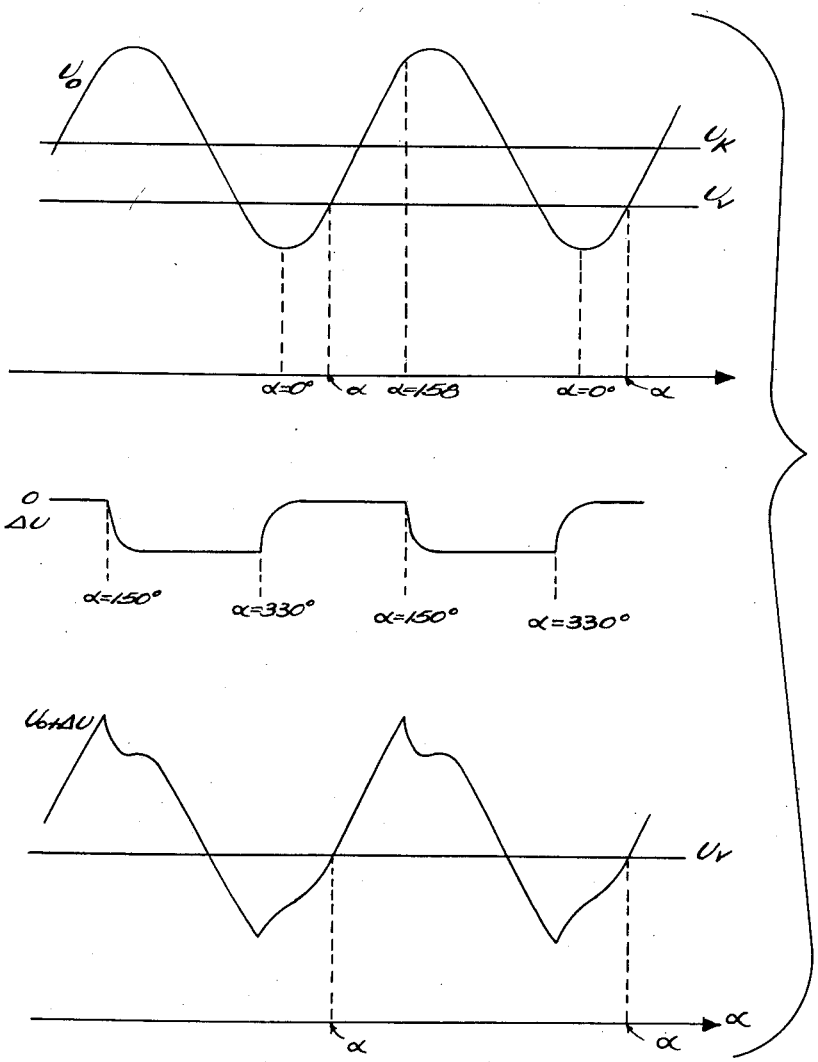
INVENTORS
Renato Noser
Fritz Felber
BY Pierce, Scheffler & Parker
ATTORNEYS

United States Patent Office 3,030,567
Patented Apr. 17, 1962

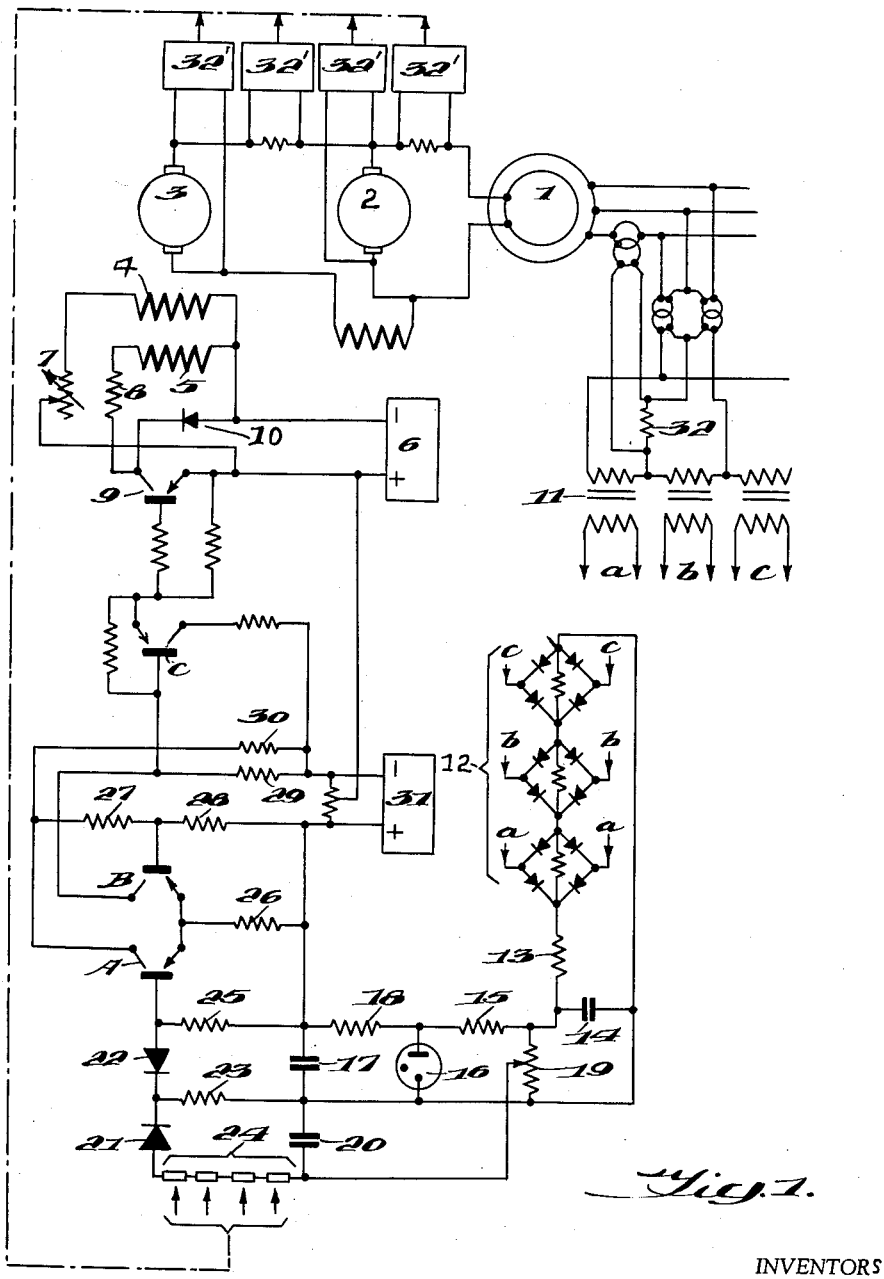

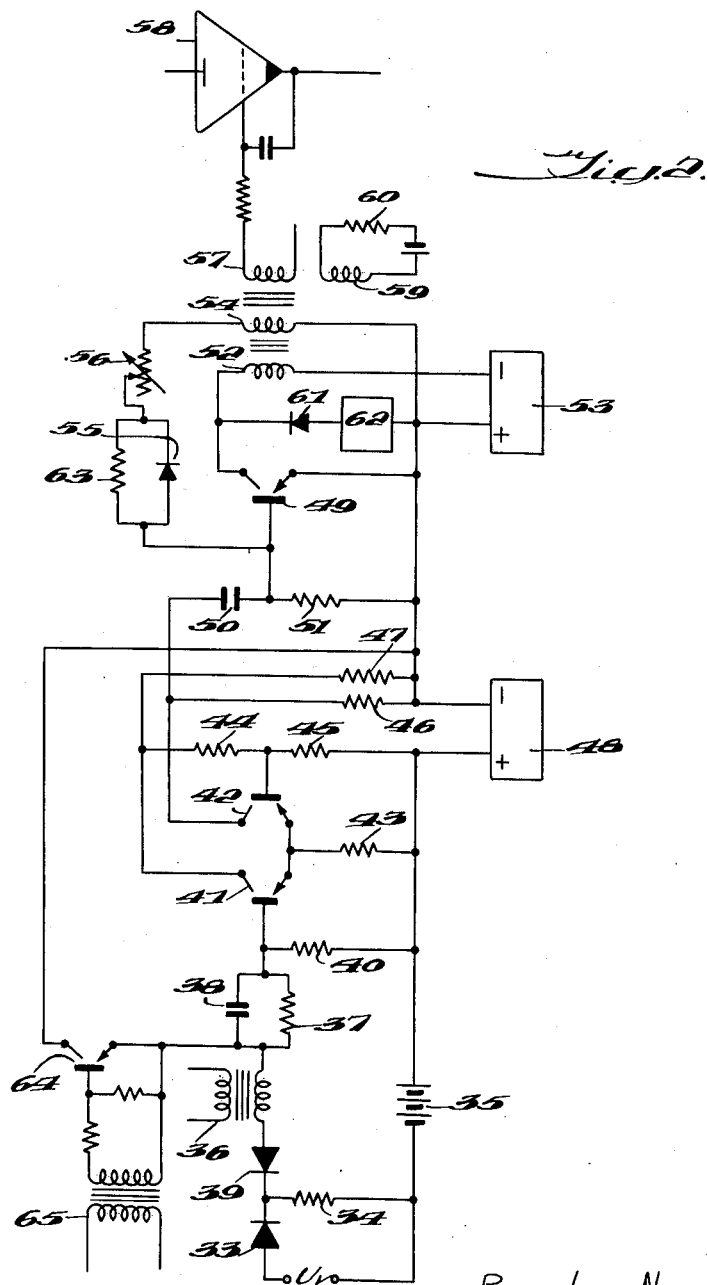

3,030,567
ELECTRICAL CONTROL ARRANGEMENT OPERATING WITH VOLTAGE-COMPARISON
Renato Noser, Ennetbaden, and Fritz Felber, Zurich, Switzerland, assignors to Aktiengesellschaft Brown, Boveri & Cie, Baden, Switzerland, a joint-stock company
Filed Sept. 30, 1958, Ser. No. 764,315
Claims priority, application Switzerland Oct. 1, 1957
6 Claims. (Cl. 322—25)

The invention relates to an arrangement which can be employed wherever an exit current is employed as the criterion on which of two entrance voltages is the greater.

The arrangement is characterized in that the source of the two voltages to be compared with each other are each connected via a rectifier with a common resistance and that in series with one of the rectifiers of the entrance circuit there is connected a bi-stable tipping-arrangement whose exit signal controls a switch transistor.

FIGURE 1, shows as the first example the application of the arrangement according to the invention to the regulation of a synchronous generator.

FIGURE 2 is a circuit diagram similar to FIG. 1 illustrating the inventive concept as applied to the operation of a grid-controlled rectifier which is supplied by a source of alternating current; and FIGURE 3 presents a series of curves illustrating the relationship between two control voltages being compared in the control system according to FIG. 2.

The generator 1, is excited by the main exciter machine 2. This machine possesses a shunt-excitation with a series-connected auxiliary exciter machine 3, which, in its turn, carries two exciter windings 4 and 5. Through the winding 4, there flows a constant negative exciter current, which comes from the source 6, and is adjustable by means of the regulable resistance 7. The positive exciter current flowing through the winding 5 comes from the same source. It is determined by the resistance 8, and is switched in or out by the switch transistor 9. A rectifier 10 connected to this circuit, prevents the occurrence of high voltage peaks at the transistor 9, during the switching operation. The arrangement is preferably dimensioned in such a way that the time constants of the circuits 5, 8, 10 for switching in and out are equally great.

The average value of the current flowing through the winding 5, and therewith, in the last analysis, the excitation of the generator 1, is therefore determined by the relative switching-in time of the transistor 9. This relative switching-in time must therefore be influenced by the magnitudes to be regulated, and hence particularly by the voltage delivered by the generator 1. The measurement of this voltage occurs by the three single-phase transformers 11 and the three rectifiers 12, connected with them. Via the resistance 32 there can be introduced a supplementary component dependent on the delivered current. The pulsating direct voltage delivered by the three series-connected rectifiers 12, is smoothed by the filter consisting of the resistance 13 and the condenser 14. With the smoothed voltage there is operated via the current-limiting resistance 15 the glow-lamp 16 or another stabilizing arrangement, for example, a Zener diode. At the condenser 17, which is connected with the two electrodes of the glow-lamp, therefore, there lies in operation a constant voltage. The resistance 18 prevents the occurrence of tipping oscillations. Parallel to the filter condenser 14 there lies the voltage divider 19, which conducts to the condenser 20 a voltage proportional to the voltage at the condenser 14. The latter voltage is therefore the magnitude to be regulated, that is, except for an accidentally-introduced current-dependent component, the magnitude dependent on the voltage delivered by the generator 1. At this the relations are selected in such a way that at the theoretical i.e. the desired value of the generator voltage to be maintained, the voltages at the condensers 17 and 20 are just equal to each other. In the illustrated example, the negative pole of each of these voltages lies at the connection point of the two condensers.

Now by analogy with the mode of operation of the familiar Tirrill regulator, provisions can be made that the winding 5 of the auxiliary exciter machine 3, is switched in by the switch transistor 9, whenever the actual voltage at the condenser 20 is smaller than the theoretical voltage at the condenser 17.

For this purpose, these two condensers as sources of the two voltages to be compared with each other are connected each via a rectifier 21 or 22, with a common resistance 23. In series with the rectifier 21 there also lies the resistances 24, which will be further discussed later; in series with the rectifier 22 there lies the entrance circuit of a bi-stable tipping arrangement consisting of the resistance 25. In the present example, the tipping-arrangement consists of the familiar Schmitt trigger, which is provided with two transistors A and B, and besides comprises the resistances 26 to 30, and is fed from the source 31.

It is easy to see that a current flows through one of the rectifiers 21 or 22 only when its voltage is higher than the voltage to be compared with it. Thus, for example, a current in the rectifier 22, wholly regardless of the absolute value of the voltages, ceases to flow as soon as the voltage at the condenser 20 goes a little above that at the condenser 17. With this, however, there also ceases the current flow through the resistance 25, and the tipping arrangement changes into the other stable state.

The exit or output signal of the tipping arrangement, which occurs at the resistance 29, controls via an amplifier the transistor C of the switch transistor 9, which, as already mentioned, influences the current in the exciter winding 5. Through the employment according to the invention of a bi-stable tipping-arrangement, it is made certain that the switch transistor 9 is always clearly switched in or out, and hence that it is never able to remain in an intermediate position which might damage it.

The great inertia of generator, exciter machine and auxiliary exciter machine would not, without special measures, enable a stable regulation. There are, therefore, provided the returning networks 32', which are proportional to the exciter-machine-voltage and -current and also to the auxiliary-exciter-machine-voltage and -current. These voltages are, as symbolically represented in the drawing, laid at the resistances 24, which are connected in series with the rectifier 21. Consequently, the returned voltages add themselves together to form the actual voltage and the relations are selected in such a way that the whole system carries out oscillations with a period which is short compared with the time constants of the machines. This gives a stable regulation of the generator voltage.

Compared with previous regulating arrangements, the arrangement here described exhibits principally the following advantages; it comprises no movable parts, particularly no contacts, and therefore requires practically no attendance; it can be made smaller and cheaper than a Tirrill contactor type regulator; the production and feeding of the voltages and their components to be compared with each other, particularly the returned voltages, can occur in high-ohmic circuits without great output loss.

FIGURE 2, shows as the second example the employment of the arrangement according to the invention in a so-called grid-controlled unit for rectifiers, that is, in an arrangement for the production of phase-regulable impulses which are suitable for the ignition of grid-controlled rectifiers.

The functioning of the illustrated grid-control unit is based on the principle known in itself of the so-called sine-vertical-control. For this purpose there is employed a sine voltage $U_s$ which runs phase-equal with the network alternating voltage feeding the rectifier. To this sine voltage there is, according to FIGURE 3, added a constant direct voltage $U_k$ of such a magnitude that the sum $U_o = U_s + U_k$ is always positive. The momentary value $U_o$ is compared with the variable control-direct-voltage $U_v$. An ignition impulse is supposed to occur whenever the difference voltage $U_o - U_v$ of negative values passes through zero, that is, always at the phase angle $\alpha$. The particular advantage of the sine-vertical-control lies in the fact that direct voltage delivered by the rectifier is linearly connected with the control voltage $U_v$.

In view of the requirements of the rectifier operation, the impulse position must be comparable in the interval $0 < \alpha < 150°$. The value 150° is here taken by way of example; certain deviations upwardly or downwardly will sometimes be desirable. Moreover, measures should be taken that no impulses occur in the interval $150° < \alpha < 360°$. Measures should also be taken that no impulses occur at rapid fluctuations of the network voltage, and that an accidental shortcircuiting between control grid and cathode of the rectifier does not result in injury to the grid-control unit.

All of these requirements are fulfilled by the regulating arrangement according to the invention.

There readily occurs the idea of replacing the controllable electrical discharge vessel employed in such grid-control units with transistors. However, such a replacement would give certain disadvantages. For fixing the impulse position as precisely as possible, it is necessary to avoid "looping cut" between the voltages $U_o$ and $U_v$ to be compared with each other; these voltages must, therefore, be as high as possible. On the other hand, the entrance-side loadability of the transistors is limited and, specifically, with respect to both the kept-out voltage and the let-through current. It is therefore necessary to limit the voltage and current in the entrance part of the transistor circuit. In view of the high voltages and low resistances, this limiting cannot be done without considerable output loss. The arrangement according to the invention avoids this disadvantage and, specifically, in the first place through the fact that the limitation occurs with voltage-strong rectifiers in high-ohmic circuits, so that even at the employment of high voltages, the output losses remain very small.

In FIGURE 2, the voltage $U_o$ and $U_v$ are compared with each other by the arrangement according to the invention. With the voltage $U_v$ there may be concerned a manually-adjustable voltage or the exit voltage of a preconnected regulator. The source for the voltage $U_o$ comprises the series-connected parts, source 35 for direct voltage $U_k$ and transformer 36 for the alternating voltage $U_s$, as well as the RC circuit 37, 38, which will be further discussed later.

The source for the voltage $U_v$ is connected via the rectifier 33 with the resistance 34. The source for the voltage $U_o$ is connected, likewise via the rectifier 39, with the resistance 34; in series with the rectifier 39 there also lies the entrance circuit, consisting of the resistance 40, of a bi-stable tipping-arrangement. The latter, also in the present second model, consists of the familiar Schmitt trigger, which is provided with the transistors 41 and 42, further comprises the resistances 43 to 47, and is fed from the direct current source 48.

The exit signal of the tipping-arrangement, which occurs at the resistance 46, controls the switch transistor 49, and, specifically, via the capacitance-resistance branch circuit 50, 51, which at each tipping of the bi-stable tipping-arrangement conducts a short impulse to the switch transistor 49. It is easy to see that a positive impulse is delivered to the switch transistor whenever the voltage $U_o$ exceeds the voltage $U_v$ from below, and hence always at the phases $\alpha$ (FIGURE 3). The negative impulses occurring between the positive impulses are without further interest. Through the employment according to the invention of a tipping-arrangement, it is made certain that the positive impulses controlling the switch transistor 49 always exhibit the same form, wholly regardless of how great the cutting angle between the curves for $U_o$ and $U_v$ is.

Formation of the ignition impulses to be conducted to the rectifier occurs with a back-coupling connection, in which there is included as the active switching element the switch transistor 49 itself. At each arrival of a positive impulse from the capacitance-resistance branch circuit 50, 51, the switch transistor 49 connects the primary winding 52 of the back-coupling transformer with the direct current source 53. The secondary winding 54 immediately sends, via the rectifier 55, in the conducting direction and the adjustable resistance 56, a back-coupling current through the switch transistor 49; simultaneously there occurs in the second secondary winding 57, the ignition impulse. The duration of this impulse is given by the voltage-time area which the back-coupling transformer can sustain. Specifically, at iron saturation, the collector current of the switch transistor 49 increases while the base current decreases. As soon as the latter is no longer sufficient to maintain the transistor fully conductive, the magnetic flux in the transformer iron decreases and the current is disconnected by the transistor.

The restoration of the whole back-coupling circuit occurs first after extinguishment of the discharge in the rectifier 58, since its grid current, even after cessation of the transistor current, maintains the iron core of the back-coupling transformer in the saturated state. The winding 59, is traversed by a direct current determined by the resistance 60, and serves for the demagnetization of the iron core at the restoration. During the restoration, the voltage induced in the primary winding 52 adds itself to the voltage of the source 53, and stresses the switch transistor in the obstructing direction. The rectifier 61 during the restoration holds this supplementary voltage constant at the value of the voltage coming from the source 62. The latter is set in such a way that the voltage-time area of the restoration period is equal to the voltage-time area of the conduction period determined by the required impulse duration.

The briefly-mentioned rectifier 55 prevents the impulses arriving from the capacitance-resistance circuit 50, 51 from flowing uselessly over the secondary winding 54. Consequently, all of the energy of these impulses is available for impelling the back-coupling circuit. The resistance 63, lying parallel to the rectifier 55, serves, in combination with the resistance 51, for stabilizing the switch transistor 49, in the obstruction period. The adjustable resistance 56, likewise briefly mentioned, serves for setting the base current in the switch transistor 49; its employment is desirable in view of the comparatively great variations in the characteristics of the transistors.

The required short-circuiting safety of the grid-control unit is assured by the fact that the back-coupling switching is impelled only by the impulse coming from the capacitance-resistance circuit 50, 51, so that a loading of the endangered switch transistor beyond the duration of this impulse does not occur even at a short-circuit at the winding 57.

If only small impulse energies are needed, the switching output of the transistor 42 can serve directly for controlling, for example, of thyratrons.

There will now also be explained the purpose of the already-mentioned RC circuit 37, 38 and of the switch element connected therewith. This supplementary switch part fulfills two functions: it prevents the occurrence of ignition impulses in the interval $150° \leq \alpha \leq 360°$ and it enables the formation of ignition impulses even at rapidly fluctuating network-voltages. If, for example, it is assumed that the network voltage decreases, the voltage $U_s$ follows this variation without delay, while the direct voltages $U_k$ and $U_v$ obtained by rectification and filtration vary only comparatively slowly. If, in such a case, the position of the ignition impulse is selected in the neighborhood of $\alpha = 0°$, then during a certain length of time no overcuttings of the curves $U_o$ and $U_v$ occur, and no ignition impulses can be produced. If, however, the position of the ignition impulse is selected in the neighborhood of $\alpha = 150°$, then there occurs an impermissible displacement of the ignition impulse toward greater values of $\alpha$.

By the alternating voltage coming from the transformer 65, the transistor 64, is opened for a half period at a time. The primary winding of this transformer is connected with two conductors of the feeding three-phase network in such a way that the transistor is always conductive during the interval $150° \leq \alpha \leq 330°$. The collector current of this transistor flows as supplementary current through the entrance circuit of the bi-stable tipping-arrangement, that is, through the resistance 40, thereby bringing it about that the transistor 41, of the Schmitt trigger is connected in this interval, regardless, of which the voltages $U_o$ and $U_v$ is the greater. An ignition impulse may therefore sometimes occur at the beginning of this interval but never during the interval. Now at the RC circuit 37, 38 there is produced by this supplementary current a voltage fall $\Delta U$, whose course is represented by the curves in FIGURE 3. This voltage fall, according to the lower curve of FIGURE 3, adds itself to the voltage $U_o$; in the end effect, therefore, the voltage according to the curve $U_o + \Delta U$ is compared with the control voltage $U_v$. It is easy to see that the above-mentioned shortcomings are now eliminated. Under the assumption that the decrease in the voltage $U_o$ at the network fluctuations is not greater than the value $\Delta U$ of the supplementary voltage coming from the RC circuit, there always exists, at any course of the fluctuation and at any setting of the ignition-time-point $\alpha$, an intersection point between the curves $U_o + \Delta U$ and $U_v$. Hence the ignition impulse never fails to occur. On the other hand a delay of the impulse position above $\alpha = 150°$ is also unable to occur, since the supplementary current actuates the bi-stable tipping-arrangement at $\alpha = 150°$ at the latest.

By simple supplementary means, the limits of the interval can be made adjustable; for example, by displacing in its phase the voltage of the transformer 65, or by feeding to the transistor 64, the sum of an alternating voltage and an adjustable direct voltage.

The curve course of the voltage $\Delta U$ at $\alpha = 150°$ is not usually symmetrical with that at $\alpha = 330°$. The course at $\alpha = 330°$ is determined by the selection of the elements 37, 38, and must be identical at all the phases of a conventional multiphase arrangement. A small time constant of the RC combination 37, 38 gives the advantage of a sharper impulse position in the region of $\alpha = 0°$ without the danger of looping cuts between the voltages $U_v$ and $U_o + \Delta U$. At this the disconnection point of the transistor 64, above at $\alpha = 330°$ must be displaced closer to $\alpha = 360°$.

We claim:

1. In a control system for producing an output signal resulting from the difference between a first voltage and a second voltage, the combination comprising a first rectifier, a second rectifier and a common first resistance, said rectifiers being connected with the electrodes of the same polarity to said first resistance, a second resistance connected to the other electrode of the second rectifier, means for applying the first voltage between the other electrode of the first rectifier and the first resistance and for applying the second voltage between the first and the second resistances, the poles of said voltages connected to the first resistance being of the same polarity, a bi-stable type circuit such as a Schmitt trigger connected to both ends of said second resistance and actuated by current flow through said second resistance, a switch transistor circuit actuated by the output from said bi-stable circuit, and a load controlled by the output of said switch transistor circuit.

2. A system as defined in claim 1, wherein said first voltage has a variable value and said second voltage is a reference voltage having a substantially constant value.

3. A system as defined in claim 1, wherein said first voltage is a reference voltage having a substantially constant value and said second voltage has a variable value.

4. A system as defined in claim 3, wherein said load is constituted by the grid of a grid-controlled power rectifier connected to a source of alternating voltage and wherein said second voltage having a variable value is composed of one unidirectional voltage component to which is added a second alternating voltage component in phase with said source of alternating voltage to which is connected said power rectifier.

5. A system as defined in claim 4 wherein between the second rectifier and the second resistance lies a circuit composed of a resistance paralleled by a condenser for stabilizing operation of said power rectifier.

6. A system as defined in claim 1, wherein said switch transistor circuit includes a transformer having its primary circuit connected in the collector-emitter circuit of said switch transistor element thereof, the secondary of said transformer being connected to effect a change in the grid voltage of said power rectifier and also being back-coupled to the base of said switch transistor element.

References Cited in the file of this patent
UNITED STATES PATENTS 2,740,086     Evans et al. _____ Mar. 27, 1956